United States Patent
Soh et al.

(10) Patent No.: US 8,786,578 B2
(45) Date of Patent: Jul. 22, 2014

(54) POINTING DEVICE AND DISPLAY APPARATUS

(75) Inventors: Byung-seok Soh, Yongin-si (KR); Sang-on Choi, Suwon-si (KR); Yong-wan Choi, Seongnam-si (KR); Mi-ra Yu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 465 days.

(21) Appl. No.: 13/114,450

(22) Filed: May 24, 2011

(65) Prior Publication Data
US 2011/0285672 A1    Nov. 24, 2011

(30) Foreign Application Priority Data
May 24, 2010    (KR) ........................ 10-2010-0047964

(51) Int. Cl.
*G06F 3/033*    (2013.01)
(52) U.S. Cl.
USPC ........... 345/179; 345/691; 345/157; 345/158; 345/166; 345/182; 345/183; 345/37; 345/41; 345/60; 178/18.01; 178/18.02; 178/19.05

(58) Field of Classification Search
None
See application file for complete search history.

(56) References Cited

U.S. PATENT DOCUMENTS

| | | | |
|---|---|---|---|
| 2009/0167753 A1* | 7/2009 | Chung | 345/214 |
| 2010/0045636 A1* | 2/2010 | Noguchi et al. | 345/179 |
| 2011/0285672 A1 | 11/2011 | Soh et al. | |

FOREIGN PATENT DOCUMENTS

KR    10-2011-0128485 A    1/2001

* cited by examiner

*Primary Examiner* — Joseph Haley
*Assistant Examiner* — Ifedayo Iluyomade
(74) *Attorney, Agent, or Firm* — Sughrue Mion, PLLC

(57) ABSTRACT

A pointing device and a display apparatus applying the same are provided. The pointing device corrects an error that occurs in a boundary between block in calculating a current location of the pointing device and calculates the current location. Accordingly, an error occurring in a boundary between blocks in calculating a current location of the pointing device is prevented.

21 Claims, 14 Drawing Sheets

FIG. 10

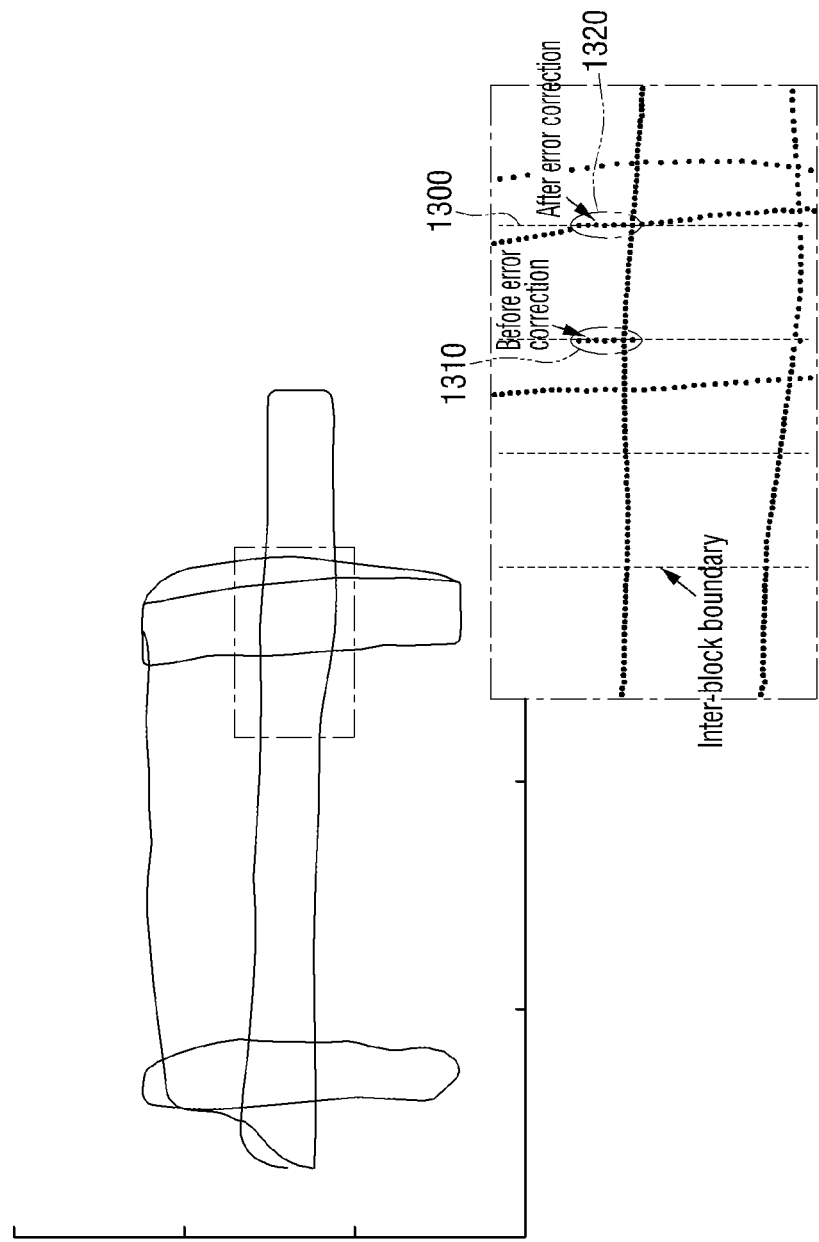

POINTING DEVICE AND DISPLAY APPARATUS

CROSS-REFERENCE TO RELATED APPLICATION

This application claims priority from Korean Patent Application No. 10-2010-0047964, filed on May 24, 2010, in the Korean Intellectual Property Office, the disclosure of which is incorporated herein by reference in its entirety.

BACKGROUND

1. Field

Apparatuses consistent with exemplary embodiments relate to a pointing device and a display apparatus, and more particularly, to a pointing device and a display apparatus which calculate a location of the pointing device and displays it on the display apparatus.

2. Description of the Related Art

An electronic board and an electronic pen are widely used for lecture, meeting, presentation, learning, and game. Using the electronic board system, users can have a lecture under a cleaner environment and expect that the electronic board system is more economical to use than a general board which requires a consumable pen.

The electronic board system is functionally superior to a general board system in that it can convert written contents into data so that the contents are easy to change or edit. Therefore, the electronic board system is considered as being in a commercially advantageous position.

A method for recognizing a pointing device in the electronic board system is divided into a sequence driving method and a block driving method. The sequence driving method generates light in sequence for an X-axis and a Y-axis such that a pointing device recognizes the light. The sequence driving method is advantageous in terms of a simple location sensing process and no non-linear section, but provides a relatively low resolution and may work abnormally because of a weak optical signal in some colors due to a characteristic of a plasma display panel (PDP) display.

In order to overcome the disadvantages of the sequence driving method, the block driving method is used. The block driving method divides the X-axis of a display panel into a plurality of blocks and generate light, and then generates light again in pixel lines within each block such that a pointing location is recognized.

The block driving method is advantageous in that an optical signal does not become weak and a sensing resolution is high, and but may cause an error in a boundary between blocks.

Therefore, there is a need for a method for sensing a location of a pointing device, which can prevent a light signal from becoming weak and increase a sensing resolution, and also, can prevent an error from occurring in a boundary between blocks.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiment provide a pointing device which corrects an error which occurs in a boundary area between blocks when calculating a current location, and calculates a current location, and a display apparatus applied to the same.

According to an aspect of an exemplary embodiment, there is provided a pointing device which operates in association with a display apparatus. The pointing device may include: an optical sensor which senses a plurality of optical signals; and a controller which calculates a current location pointed by the pointing device on a screen of the display apparatus divided into a plurality of blocks, based on points of time at which the plurality of optical signals are sensed by the optical sensor on the screen of the display apparatus, wherein the controller calculates the current location using the plurality of blocks, and corrects a location error that occurs when the current location pointed by the pointing device is located adjacent to a boundary area between at least two adjacent blocks among the plurality of blocks.

The plurality of optical signals may include first, second and third optical signals, and the controller may calculate a first axis coordinate of the current location based on a first point of time at which the first optical signal is sensed, first location information indicating a location of a block, among the plurality of blocks, to which a second axis coordinate of the pointing device belongs, based on a second point of time at which the second optical signal is sensed, second location information indicating a location within a block group comprising at least two adjacent blocks among the plurality of blocks, based on a third point of time at which the third optical signal is sensed, and the second axis coordinate of the current location based on the first location information and the second location information. The plurality of optical signals may further include at least one reference signal, and the controller may further calculate at least one reference point of time at which the at least one reference signal is sensed, respectively, the first axis coordinate based on the first point of time and the at least one reference point of time, and the second axis coordinate based on the first location information, the second location information and the at least one reference point of time.

If the location within the block group corresponding to the second location information does not correspond to the location of the block corresponding to the first location information, the controller may determine that the location error has occurred.

If it is determined that the location error has occurred, the controller may change the first location information or the second location information, thereby correcting the error.

If the block corresponding to the first location information is a first block of a specific block group and the location corresponding to the second location information is a location included in a final block of the block group, the controller may determine that the location error has occurred and changes the first location information so that the block corresponding to the first location information is changed to a previous block.

If the block corresponding to the first location information is a first block of a specific block group and the location corresponding to the second location information is a location included in a final block of the block group, the controller may determine that the location error has occurred and changes the second location information so that the location corresponding to the second location information is changed to a location included in the block corresponding to the first location information.

If the block corresponding to the first location information is a final block of a specific block group and the location corresponding to the second location information is a location included in a first block of the block group, the controller may determine that the location error has occurred and changes the first location information so that the block corresponding to the first location information is changed to a next block.

If the block corresponding to the first location information is a final block of a specific block group and the location corresponding to the second location information is a location included in a first block of the block group, the controller may determine that the location error has occurred and changes the second location information so that the location corresponding to the second location information is changed to a location included in the block corresponding to the first location information.

The plurality of optical signals may be infrared light.

The pointing device may further include a communication unit which transmits information about the calculated current location to the display apparatus.

According to an aspect of another exemplary embodiment, there is provided a display apparatus. The display apparatus may include: a display panel which is divided into a plurality of blocks and displays an input image, a driving unit which applies a driving voltage to the display panel, and a controller which controls the driving unit to drive the display panel over a first light emitting period, a second light emitting period, and a third light emitting period, wherein, during the first light emitting period, the controller controls pixel lines of a first axis direction on the display panel emit light on a line basis in sequence, during the second light emitting period, the controller controls pixel lines of a second axis direction included in each block group, comprising at least two blocks of the plurality of blocks, emit light on a line basis in sequence with respect to all of the block groups, and during the third light emitting period, the controller controls pixels included in each block of the plurality of blocks to emit light at a time on a block basis in sequence with respect to all of the blocks.

The controller may further control the driving unit to drive the display panel over a fourth light emitting period during which all of pixels included in the plurality of blocks on the display panel emit light at the same time a predetermined number of times.

The controller may control the display panel to be driven in an order of the first light emitting period, the fourth light emitting period, the second light emitting period, and the third light emitting period.

The first axis direction may be an x-axis direction with respect to the display panel, and the second axis direction may be a y-axis direction with respect to the display panel.

The light emitted during the first light emitting period, the second light emitting period, and the third light emitting period may be infrared light.

The display apparatus may be a plasma display panel (PDP) display apparatus.

As described above, according to the exemplary embodiments, the pointing device and the display apparatus which correct an error occurring when calculating a current location in a boundary between blocks and calculate a current location are provided so that the error occurring in the inter-block boundary in calculating the location of the pointing device can be prevented.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 10 is a view illustrating a structure of block groups and blocks of a display panel according to an exemplary embodiment;

FIG. 13 is a view illustrating a location calculated before error correction is made and a location calculated after error correction is made according to an exemplary embodiment.

DETAILED DESCRIPTION OF THE EXEMPLARY EMBODIMENTS

Figure 1:
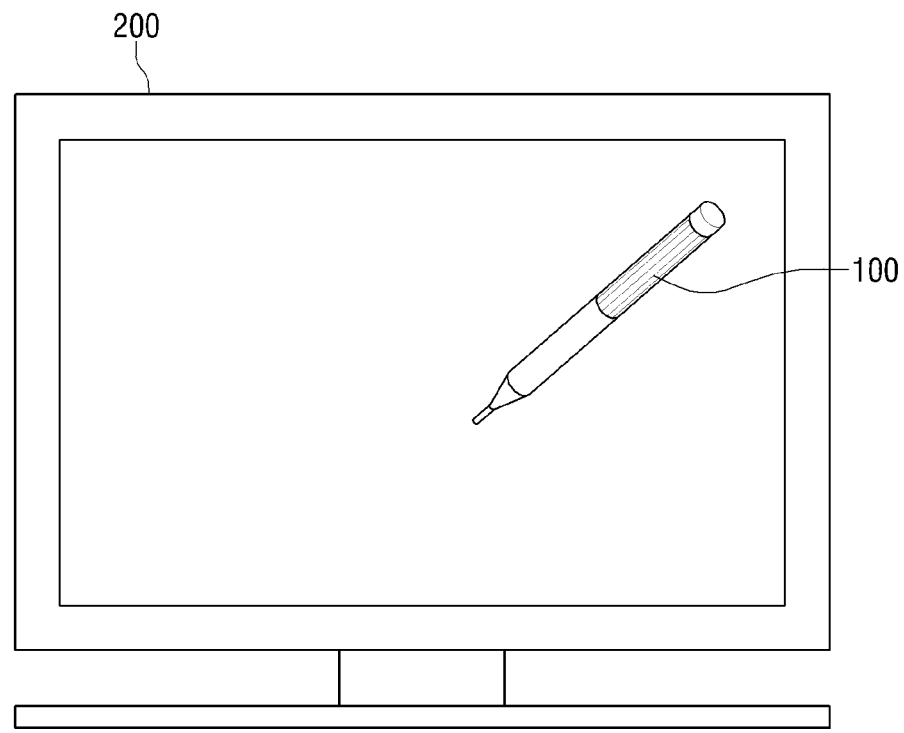
FIG. 1 is a view illustrating a pointing system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a pointing system according to an exemplary embodiment. As shown in FIG. 1, the pointing system includes a pointing device 100 and a television (TV) 200.

The pointing system, which is a kind of electronic pen and display system, displays images, texts, and graphics on a screen area desired by a user according user's manipulation, and is generally used for meeting, presentation, lecture, learning, and game.

The pointing device 100 is a means for inputting user's manipulation. Therefore, the user manipulates the pointing device 100 on the screen of the TV 200, thereby allowing contents, such as images, desired by the user to be displayed on a screen area according to user's manipulation.

For example, if the user holds the pointing device 100 and controls the pointing device 100 to approach or touch a desired screen area, the TV 200 displays images, texts, and graphics on the approached or touched area. Therefore, the user can select a desired point on the screen of the TV 200 using the pointing device 100. Also, the user can input desired letters or figures on the screen of the TV 200 using the pointing device 100 like a pen.

In the pointing system according to an exemplary embodiment, when the pointing device 100 approaches or touches the TV 200, the pointing device 100 senses a signal output from the TV 200. Then, the pointing device 100 transmits the sensed current location information to the TV 200 such that the TV 200 determines the location of the pointing device 100 on the screen on a real time basis based on the received current location information.

The TV 200 is a kind of display apparatus, and, more specifically, a kind of display apparatus using a plasma display panel (PDP) to which a plasma method is applied. The TV 200 processes an image received by wire or wirelessly, and displays the image on the screen. The TV 200 operates in association with the pointing device 100, and is used as an electronic board to display diverse functions on the screen according to user's manipulation using the pointing device 100.

According to an exemplary embodiment, the TV 200 generates and outputs an optical signal for sensing the pointing device 100 approaching so that the pointing device 100 senses the current location. The optical signal is an infrared light optical signal, according to an exemplary embodiment. If the infrared light is used as an optical signal, the TV 200 is able to output the optical signal for sensing the location of the pointing device without interfering a displayed original image.

If the pointing device 100 generates current location information of the pointing device 100 on the screen using the sensed signal, and transmits the current location information to the TV 200, the TV 200 receives the location information from the pointing device 100. The TV 200 displays images, texts, and graphics on a screen area corresponding to the received location information, or performs a function relating to the screen area corresponding to the received location information (for example, a function of selecting a pointed area).

The process of generating the current location information of the pointing device 100 by the pointing device 100, and the process of outputting the optical signal by the TV 200 will be explained in detail below.

Although the TV 200 has been explained as an exemplary display apparatus used as an electronic board in the above, this is merely an example for convenience of explanation. The present disclosure may be applied to another type of display apparatus such as a monitor. The same is applied to the following explanation.

Figure 2:
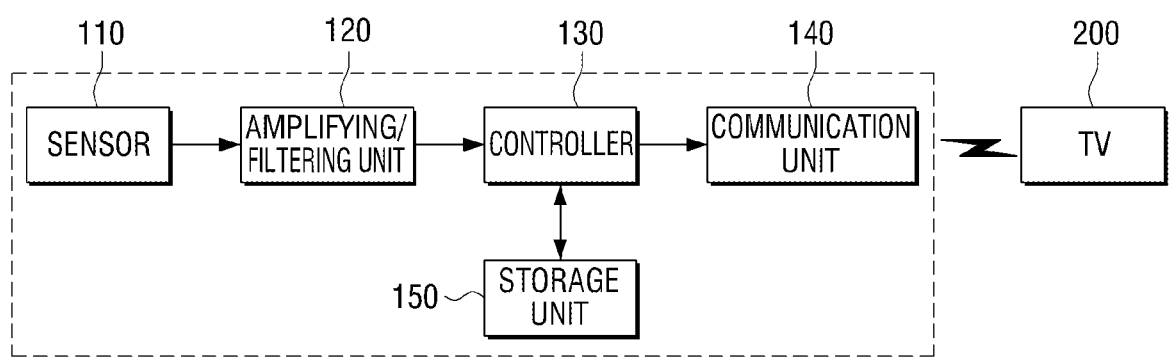
FIG. 2 is a block diagram illustrating a pointing device according to an exemplary embodiment.

FIG. 2 is a block diagram illustrating the pointing device 100 according to an exemplary embodiment. In FIG. 2, the pointing device 100 is shown along with the TV 200 for convenience of explanation. As shown in FIG. 2, the pointing device 100 includes an optical sensor 110, an amplifying/filtering unit 120, a controller 130, a communication unit 140, and a storage unit 150.

The optical sensor 110 senses optical signals of a specific frequency range. If the optical signals are infrared signals, the optical sensor 110 senses infrared signals. The optical sensor 110 is located where light output from the TV 200 enters, and senses infrared signals emitted from a part of the screen area of the TV 200. The optical sensor 110 transmits the sensed infrared signals to the amplifying/filtering unit 120.

The amplifying/filtering unit 120 amplifies the infrared signals sensed by and transmitted from the optical sensor 110, removes a noise from the amplified signals, and re-amplifies the signals so that the noise-removed signals have a clear pitch in a waveform. The re-amplified signals are applied to the controller 130.

The controller 130 controls overall operation of the pointing device 100. In particular, the controller 130 extracts signals from the re-amplified signals that have a level greater than or equal to a predetermined threshold. The controller 130 compares patterns of these signals with a reference signal pattern stored in the storage unit 150, which will be described later. The controller 130 calculates a current location of the pointing device 100 corresponding to a location pointed by the pointing device 100 on the screen of the TV 200, based on points of time when the optical signals are sensed by the optical sensor 110.

More specifically, the controller 130 compares the patterns of the signals having a level greater than or equal to the threshold among the re-amplified optical signals with the reference signal pattern stored in the storage unit 150. If there is a signal having a pattern identical to the reference signal pattern among the signals having the level greater than or equal to the threshold, the controller 130 determines the point of time at which the corresponding signal is sensed to be a point of time at which a reference signal is sensed. Also, the controller 130 calculates time differences between the point of time at which the reference signal is received and the points of time at which the re-amplified optical signals are received, and generates the location information of the pointing device 100 using the time differences.

The controller 130 calculates the current location information of the pointing device 100 using a plurality of blocks formed on the screen of the TV 200. More specifically, the controller 130 calculates points of time at which a first optical signal, a second optical signal, and a third optical signal are sensed with reference to the point of time at which the reference signal is sensed. The first optical signal is for calculating a y-coordinate of the pointing device 100, the second optical signal is for calculating a location of a block to which an x-coordinate of the pointing device 100 belongs, and the third optical signal is for calculating an x-coordinate of the pointing device 100 within a block group including at least two blocks.

The block is a basis on which the screen area of the TV 200 is divided into a plurality of areas in an x-axis direction. That is, the screen of the TV 200 (that is, the display panel of the TV 200) is divided into a plurality of blocks. The block group is a unit including at least two blocks. The block groups and the blocks of the display panel of the TV 200 will be described in detail with reference to FIG. 10.

The controller 130 calculates a y-coordinate of a current location of the pointing device 100 based on the point of time at which the first optical signal is sensed, calculates information about a location of a block to which an x-coordinate of the pointing device 100 belongs (hereafter "first location information" corresponding to block location information), based on the point of time at which the second optical signal is sensed, and calculates information about a location within a block group including at least two blocks (hereafter "second location information" corresponding to information about a location within a block group), based on the point of time at which the third optical signal is sensed. Also, the controller 130 calculates an x-coordinate of the current location based on the first location information and the second location information. More specifically, the controller 130 calculates the x-coordinate by applying the block location information, corresponding to the first location information, and the information about the location within the block group, corresponding to the second location information, to the table shown in FIG. 10. The process of calculating the x-coordinate will be explained in detail with reference to FIG. 10.

The controller 130 determines whether there is an error in the calculated x-coordinate, that is, an error in calculating a current location in a boundary between the blocks. If it is determined that there is an error, the controller 130 corrects the error.

More specifically, if the location within the block group corresponding to the second location information does not correspond to a location of the block corresponding to the first location information, it is determined that an error of calculation of a current location occurs. If it is determined that the error of calculation of a current location occurs, the controller 130 changes the first location information or the second location information to correct the error.

There are four cases where an error occurs in calculating a current location in a boundary of blocks, i.e., an inter-block boundary, and four methods for correcting the error, as described below.

As a first case, if a block corresponding to the first location information is a first block of a specific block group, and a location corresponding to the second location information is a location included in a final block of the block group, it is determined that an error of calculation of a current location occurs. The controller 130 changes the first location information such that the block corresponding to the first location information is changed to a previous block.

Figure 10:
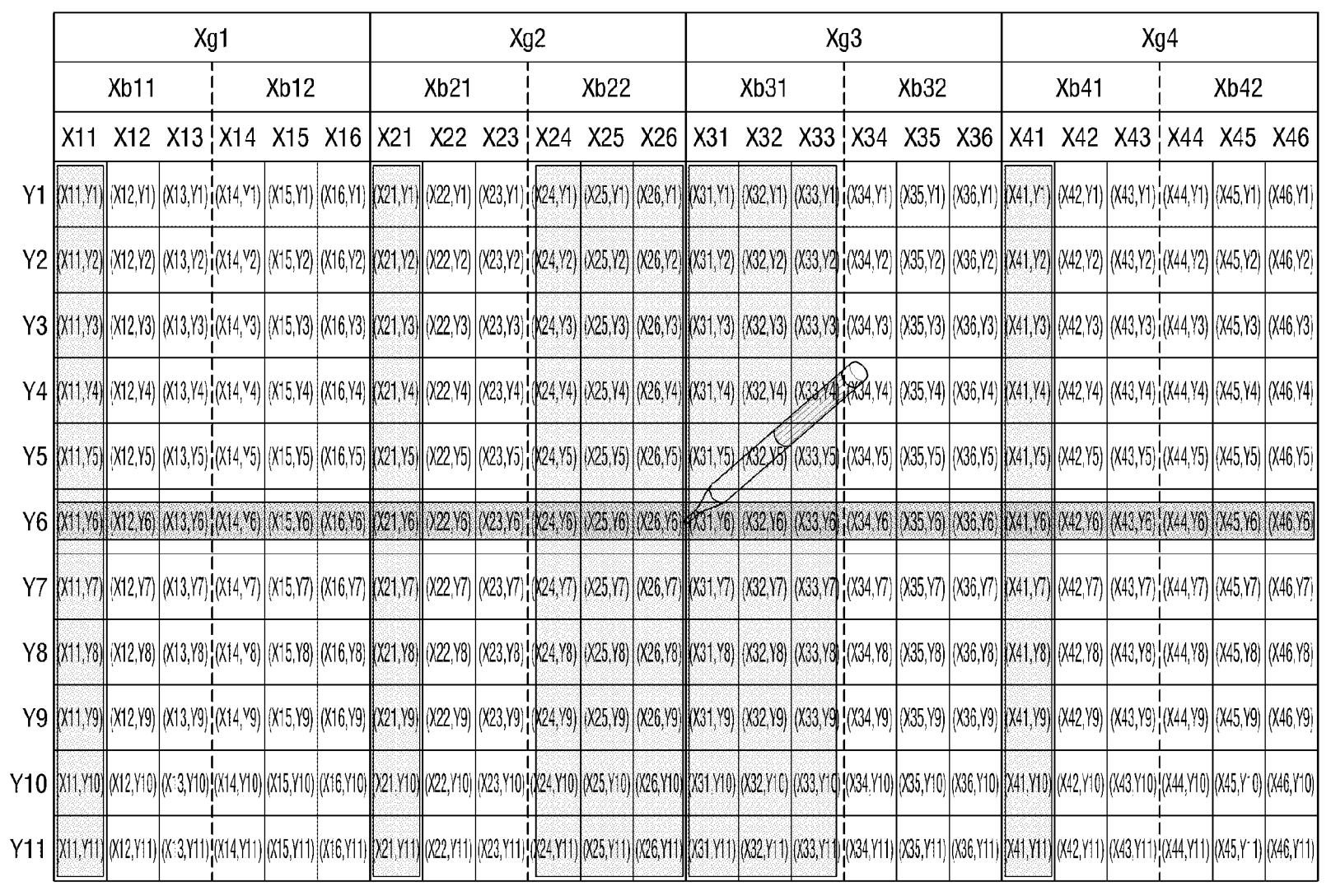

For example, an explanation will be provided with reference to FIG. 10. FIG. 10 illustrates the pointing device 100 located at a boundary between block Xb22 and block Xb31. If the controller 130 senses that the first location information is block Xb31 (the first block of block group Xg3) and senses that the second location information is location number 6, the controller 130 determines that an error of calculation of a current location occurs since block Xb31 includes only location numbers 1 to 3. The controller 130 changes the first location information such that the first location information indicates block Xb22 which is a previous block of block Xb31. Then, since block Xb22 includes location number 6, the controller 130 determines that the x-coordinate of the current location of the pointing device 100 is X26 (that is, location number 6 of block group Xg2 (block Xb22)). Accordingly, the controller 130 can correct the error in the x-coordinate of the current location.

As a second case, if a block corresponding to the first location information is a first block of a specific block group and a location corresponding to the second information is a location included in a final block of the block group, it is determined that an error of calculation of a current location occurs. Also, the controller 130 changes the second location information such that the location corresponding to the second location information is changed to a location included in the block corresponding to the first location information.

For example, the second case will be explained with reference to FIG. 10. FIG. 10 illustrates the pointing device 100 located at the boundary between block Xb22 and Xb31. The controller 130 senses that the first location information is block Xb31 (that is, a first block of block group Xg3) and that the second location information is location number 6, the controller 130 determines that an error of calculation of a current location occurs since block Xb31 includes only location numbers 1-3. The controller 130 changes the second location information to indicate location number 1. Then, since block Xb31 includes location number 1, the controller 130 determines that the x-coordinate of the current location of the pointing device 100 is X31 (that is, location number 1 of block group Xg3 (block Xb31)). Accordingly, the controller 130 can correct the error in the x-coordinate of the current location.

As a third case, if a block corresponding to the first location information is a final block of a specific block group and a location corresponding to the second location information is a location included in a first block of the block group, the controller 130 determines that an error of calculation of a current location occurs. The controller 130 changes the first location information such that the block corresponding to the first location information is changed to a next block.

For example, the third case will be explained with reference to FIG. 10. FIG. 10 illustrates the pointing device 100 located at the boundary between blocks Xb22 and Xb31. If the controller 130 senses that the first location information is block Xb22 (that is, a final block of block group Xg2) and that the second location information is location number 1, the controller determines that an error of calculation of a current location occurs since block Xb22 includes only location numbers 4-6. The controller 130 changes the first location information such that the first location information indicates block Xb31 which is the next block of block Xb22. Then, since block Xb31 includes location number 1, the controller 130 determines that the x-coordinate of the current location of the pointing device 100 is X31 (that is, location number 1 of block group Xg3 (block Xb31)). Accordingly, the controller 130 can correct the error in the x-coordinate of the current location.

As a fourth case, if a block corresponding to the first location information is a final block of a specific block group and a location corresponding to the second location information is a location included in a first block of the block group, the controller 130 determines that an error of calculation a current location occurs. The controller 130 changes the second location information such that the location corresponding to the second location information is changed to a location included in the block corresponding to the first location information.

For example, the fourth case will be explained with reference to FIG. 10. FIG. 10 illustrates the pointing device 100 located at the boundary between block Xb22 and block Xb31. If the controller 130 senses that the first location information is block Xb22 (that is, a final block of block group Xg2) and that the second location information is location number 1, the controller 130 determines that an error of calculation of a current location occurs since block Xb22 includes only location numbers 4-6. The controller 130 changes the second location information to indicate location number 6. Then, since block Xb22 includes location number 6, the controller determines that the x-coordinate of the current location of the pointing device 100 is X26 (that is, location number 6 of block group Xg2 (block Xb22)). Therefore, the controller 130 can correct the error in the x-coordinate of the current location.

As described above, the controller 130 can correct the error which occurs when the current location of the pointing device 100 is near to the boundary area between the blocks or on the boundary area. That is, the pointing device 100 according to an exemplary embodiment can correct the error occurring in the calculated x-coordinate.

The controller 130 transmits the calculated current location information or the corrected current location information to the TV 200 through the communication unit 140. The communication unit 140 transmits the current location information to the TV 200 using diverse wireless communication schemes such as wireless LAN or Bluetooth.

The storage unit 150 stores a program or data for operating the pointing device 100, and in particular, stores the reference signal pattern to be compared with the patterns of the signals having the level greater than or equal to the threshold. For example, the storage unit 150 may store a reference signal pattern corresponding to four signals generated at regular time intervals.

As described above, the pointing device 100 calculates its own current location on the screen of the TV 200, and transmits the calculated location information to the TV 200. Also, since the pointing device 100 can correct the error occurring in the boundary area between the blocks, the error occurring in the inter-block boundary can be prevented, and the accuracy of calculating the current location can be improved.

Hereinafter, the TV 200 will be explained in detail with reference to FIG. 3.

Figure 3:
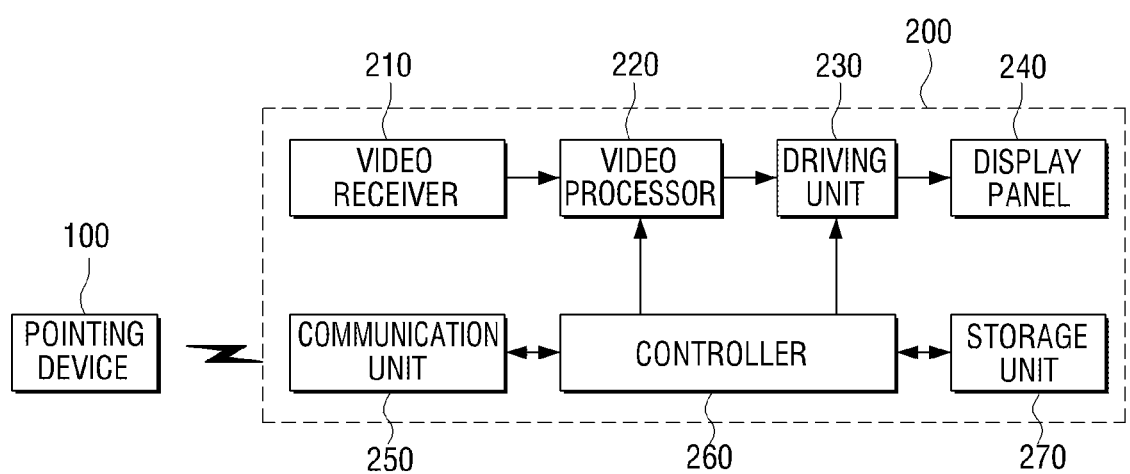
FIG. 3 is a block diagram illustrating a television (TV) according to an exemplary embodiment.

FIG. 3 is a block diagram illustrating the TV 200 according to an exemplary embodiment. As shown in FIG. 3, the TV 200 includes a video receiver 210, a video processor 220, a driving unit 230, a display panel 240, a communication unit 250, a controller 260, and a storage unit 270. The TV 200 is illustrated along with the pointing device 100 of FIG. 1 for convenience of explanation.

The video receiver 210 receives broadcast signals provided from a broadcasting station, video signals provided from an external device connected by wire or wirelessly, or video signals stored in a storage medium disposed inside the TV 200. The video receiver 210 transmits the received broadcast signals or video signals (hereinafter, called "video signals") to the video processor 220.

The video processor 220 performs signal-processing such as video separating, video decoding, and video scaling with respect to the video signals output from the video receiver 210. Also, the video processor 220 generates video signals based on data received from the controller 260. In particular, the video processor 220 generates the video signals for displaying images, texts, and graphics on a screen area corresponding to the location of the pointing device 100, based on the location data of the pointing device 100 which is received from the controller 260. The video processor 220 transmits the signal-processed video signals to the driving unit 230.

The driving unit 230 drives the display panel 240 to display an image corresponding to the received video signals on the screen, and the display panel 240 is driven by the driving unit 230 to provide an image that is viewable by a user. Detailed operation of the driving unit 230 and the display panel 240 will be explained with reference to FIG. 4.

The communication unit 250 is communicably connected to the pointing device 100, and receives the location information about the current location of the pointing device 100 on the TV 200 from the pointing device 100. The location information includes x-coordinate information and y-coordinate information regarding a point of the display panel 240 where the pointing device 100 is located. The communication unit 250 transmits the location information received from the pointing device 100 to the controller 260.

The controller 260 controls overall operation of the TV 200. The controller 260 controls the video processor 220 to signal-process the video signals received through the video receiver 210, and controls the driving unit 230 to generate a driving voltage according to the processed video signals and apply the driving voltage to the display panel 240. Accordingly, the display panel 240 displays an image corresponding to the received video signals.

Also, the controller 260 analyzes the location information of the pointing device 100 received through the communication unit 250, and generates a signal according to the result of analysis, and transmits the signal to the video processor 220. Accordingly, the video processor 220 generates the video signals for displaying images, texts, and graphics on the screen area corresponding to the location of the pointing device 100 based on the location information of the pointing device 100 received from the controller 260.

For example, the controller 260 controls to display a point on the screen area corresponding to the location information of the pointing device 100 at regular time intervals. By doing so, the controller 260 can control the pointing device 100 to serve as a pen for drawing a desired image on the screen of the TV 200.

Also, the controller 260 controls the driving unit 230 to transmit the driving voltage generated by the driving unit 230 to the display panel 240. By doing so, the controller 260 controls the driving unit 230 to display the input image on the display panel 240.

In addition, the controller 260 controls the display panel 240 to emit an infrared ray signal for the pointing device 100. More specifically, the controller 260 allocates a specific period of time for emitting the infrared signal for the pointing device 100 in the intervals when displaying the input image. Accordingly, the TV 200 is able to calculate the location of the pointing device 100 while the image is being displayed.

More specifically, the controller 260 controls the display panel 240 to emit infrared light in a period including a Y light emitting period, a reference signal light emitting period, an X2 light emitting period, and an Xb light emitting period in sequence. The Y light emitting period is a period during which pixel lines of an x-axis direction on the display panel emit light on a line basis in sequence. The reference signal light emitting period is a period during which all pixels on the display panel emit light simultaneously a predetermined number of times. Also, the X2 light emitting period is a period during which pixel lines of a y-axis direction included in each block group emits light one by one in sequence for all of the block groups. Also, the Xb light emitting period is a period during which pixels included in each block emit light simultaneously in the order of blocks.

Figure 9:
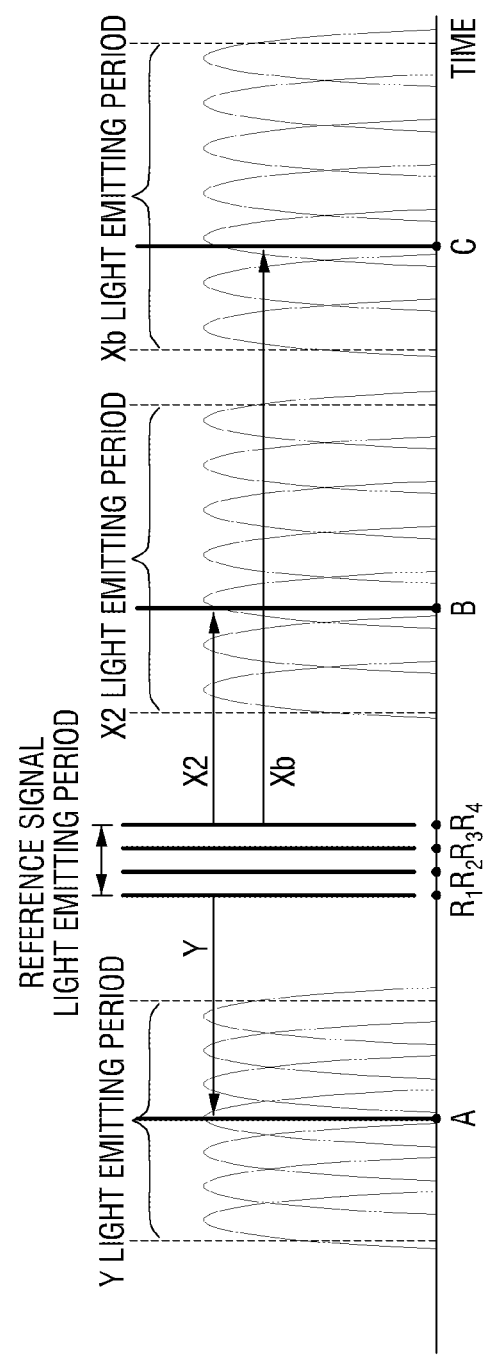
FIG. 9 is a view illustrating a period of an optical signal output from a TV according to an exemplary embodiment.

This will be explained with reference to FIG. 9. As shown in FIG. 9, infrared light for calculating the location of the pointing device 100 are emitted in the four periods. More specifically, FIG. 9 illustrates the Y light emitting period, the reference signal light emitting period, the X2 light emitting period, and the Xb light emitting period. Also, the reference signal refers to an optical signal that is generated four times repeatedly at regular time intervals. However, apart from this pattern, the reference signal may be of any pattern that can be recognized by the pointing device 100.

The controller 260 allocates infrared light emitting periods as shown in FIG. 9 in a predetermined period constituting one frame of an image.

The storage unit 270 stores diverse programs and data necessary for the operation of the TV 200.

Figure 4:
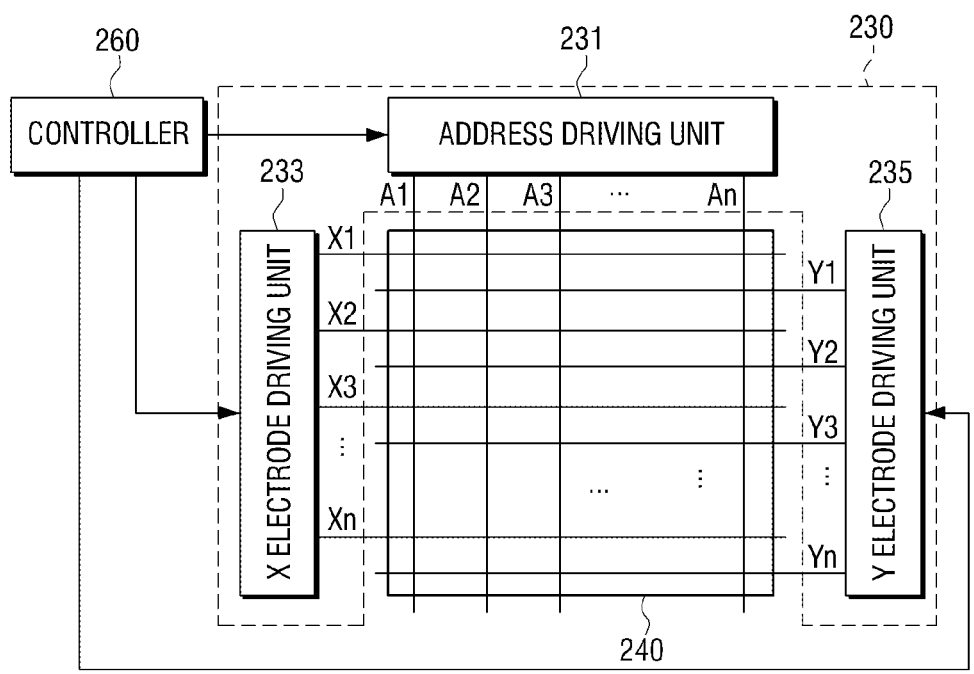
FIG. 4 is a schematic view illustrating a driving unit and a display panel according to an exemplary embodiment.

FIG. 4 is a schematic view illustrating the driving unit 230 and the display panel 240 according to an exemplary embodiment. For convenience of explanation, the controller 260 is illustrated in addition to the driving unit 230 and the display panel 240. As shown in FIG. 4, the driving unit 230 includes an address driving unit 231, an X-electrode driving unit 233, and a Y-electrode driving unit 235.

The display panel 240 includes a plurality of address electrodes A1-An arranged in a vertical direction, and a plurality of X electrodes X1~Xn and a plurality of Y-electrodes Y1~Yn arranged in a horizontal direction in pairs. The X-electrodes are arranged to correspond to the Y-electrodes.

Also, the display panel 240 includes a substrate (not shown) on which the X-electrodes and the Y-electrodes are arranged, and a substrate (not shown) on which the address electrodes are arranged. The two substrates face each other leaving a discharge space therebetween so that the Y-electrodes and the X-electrodes lie at right angles to the address electrodes. The discharge space formed at the intersecting point of the address electrodes and the X-electrodes and the Y-electrodes forms a discharge cell.

The address driving unit 231 receives an address electrode driving signal from the controller 260, and applies an address driving voltage to each address electrode in order to select a discharge cell to be displayed.

Also, the address driving unit 231 applies the address driving voltage to each line of the display panel 240 in sequence in a specific sub-field section so that the infrared signals can be sensed from a surface of the display panel 240.

The X-electrode driving unit 233 receives an X-electrode driving control signal from the controller 260 and applies a driving voltage to the X-electrodes. The Y-electrode driving unit 235 receives a Y-electrode driving control signal from the controller 260 and applies a driving voltage to the Y-electrodes. Accordingly, the X-electrode driving unit 233 and the Y-electrode driving unit 235 receive the driving control signals from the controller 260 and inputs the driving voltage to the X-electrodes and the Y-electrodes alternately, thereby performing a sustain discharge with respect to a selected discharge cell.

The Y-electrode driving unit 235 applies a Y-electrode driving voltage to each line of the display panel 240 in sequence in a specific sub-field section so that infrared signals can be sensed from the surface of the display panel 240.

The display panel 240 is driven in the way as described above.

Figure 5:
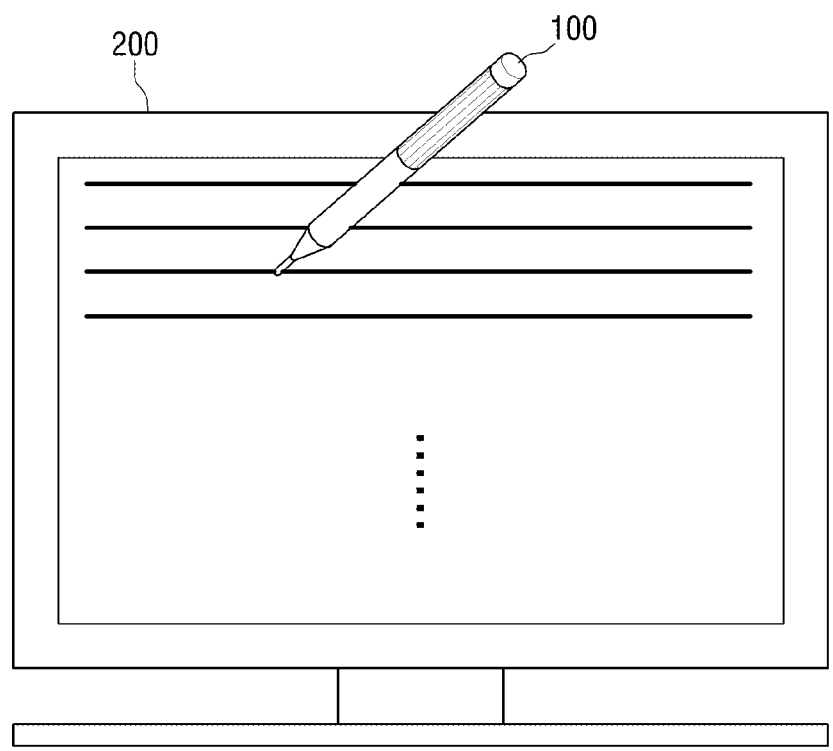
FIG. 5 is view illustrating pixels arranged on a display panel in an x-axis direction and emitting infrared light line by line according to an exemplary embodiment.

FIG. 5 is a view illustrating pixel lines of an x-axis direction on the display panel 240 which emit infrared light on a line basis according to an exemplary embodiment. As shown in FIG. 5, the TV 200 controls pixel lines of the x-axis direction to emit light one by one so that the pointing device 100 can sense a y-coordinate.

Figure 6:
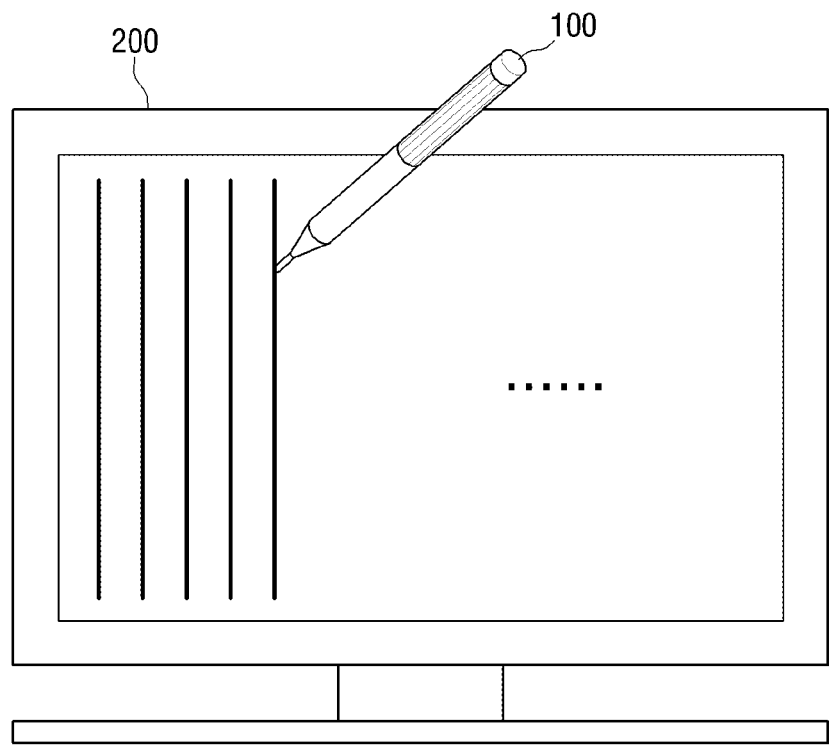
FIG. 6 is a view illustrating pixels arranged on a display panel in a y-axis direction and emitting infrared light line by line according to an exemplary embodiment.

FIG. 6 is a view illustrating pixel lines of a y-axis direction on the display panel which emit infrared light on a line basis. As shown in FIG. 6, the TV 200 controls the pixel lines of the y-axis direction to emit light one by one so that the pointing device 100 can sense an x-coordinate. The TV 200 may emit infrared light on a block basis so that the pointing device 100 can sense the x-coordinate.

Figure 7:
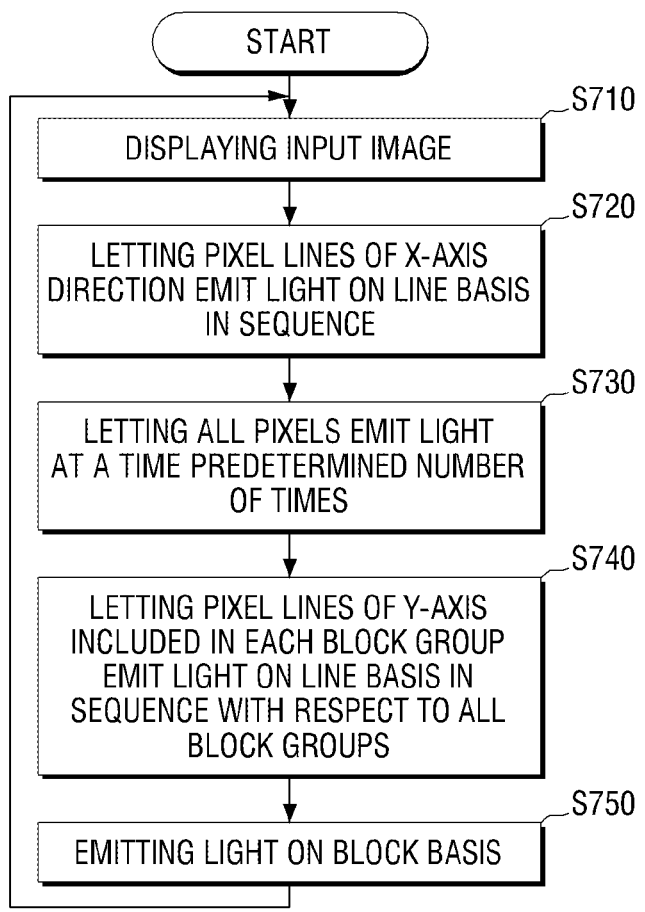
FIG. 7 is a flowchart illustrating a process of driving a TV according to an exemplary embodiment.
Figure 8:
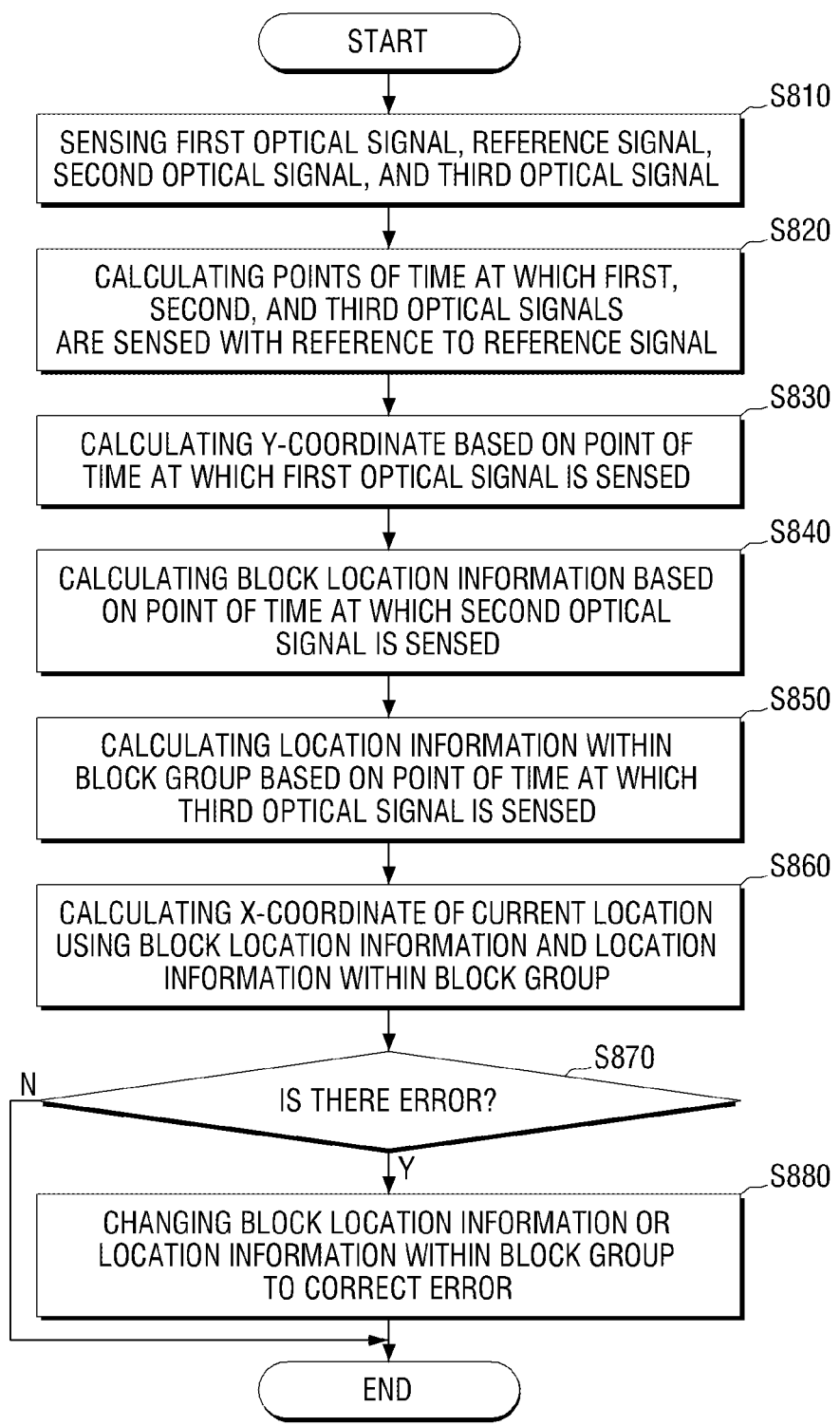
FIG. 8 is a flowchart illustrating a process of calculating a current location of a pointing device according to an exemplary embodiment.

Hereinafter, the operations of the pointing device 100 and the TV 200 will be explained in detail with reference to FIGS. 7 and 8. FIG. 7 is a flowchart illustrating a driving process of the TV 200 according to an exemplary embodiment.

The TV 200 displays an input image (S710). The TV 200 emits infrared light for the pointing device between periods for displaying one frame. The TV 200 emits the infrared light during each period of a Y light emitting period, a reference signal light emitting period, an X2 light emitting period, and an Xb light emitting period in sequence.

More specifically, the TV 200 controls the pixel lines of an x-axis direction on the display panel to emit light one by one during the Y light emitting period (S720). After that, the TV 200 controls all of the pixels on the display panel to emit light simultaneously a predetermined number of times during the reference signal light emitting period (S730). Next, the TV 200 controls the pixel lines of a y-axis direction included in each block group to emit light one by one in sequence with respect to all of the block groups during the X2 light emitting period (S740). Finally, the TV 200 controls the pixels included in each block to emit light at a time on a block basis in sequence with respect to all of the bocks during the Xb light emitting period (S750).

Through the above-described process, the TV 200 emits infrared light so that the pointing device 100 can calculate a current location.

Hereinafter, the operation of the pointing device 100 will be explained with reference to FIG. 8. FIG. 8 is a flowchart illustrating a process of calculating a current location of the pointing device 100 according to an exemplary embodiment.

The pointing device 100 senses a first optical signal, a reference signal, a second optical signal, and a third optical signal through the optical sensor 110 (S810). The pointing device 100 identifies whether the pattern of the sensed reference signal is identical to a stored reference signal pattern and determines a point of time when the reference signal is sensed.

After that, the pointing device 100 calculates a time difference of each of the first optical signal, the second optical signal, and the third optical signal over the time when the reference signal is sensed, thereby calculating a point of time when each of the first optical signal, the second optical signal, and the third optical signal is sensed with reference to the reference signal (S820).

The pointing device 100 calculates a y-coordinate of a current location of the pointing device 100 based on the point of time of sensing the first optical signal (S830). The pointing device 100 calculates the first location information (that is, block location information) indicating a location of a block to which an x-coordinate of the pointing device 100 belongs, based on the point of time of sensing the second optical signal (S840). The pointing device 100 calculates second location information (that is, information about a location within a block group) indicating a location within a block group including at least two blocks, based on the point of time of sensing the third optical signal (S580).

The pointing device 100 calculates an x-coordinate of the current location based on the first location information and the second location information (S860). More specifically, the pointing device 100 calculate the x-coordinate by applying the block location information according to the first location information and the location information within the block according to the second location information to the table shown in FIG. 10. The process of calculating the x-coordinate will be explained in detail with reference to FIG. 10.

After that, the pointing device 100 determines whether there is an error in the calculated x-coordinate (S870). If it is determined that there is an error in a boundary between the blocks (S870-Y), the pointing device 100 changes the first location information (block location information) or the second location information (information about a location within a block group), thereby correcting the error (S880).

More specifically, if the location within the block group corresponding to the second location information does not correspond to the location included in the block corresponding to the first location information, the pointing device 100 determines that there is an error of current location in calculating the current location. If it is determined that there is an error of calculation of the current location, the pointing device 100 changes the first location information or the second location information, thereby correcting the error.

There are four cases in which an error occurs in a boundary between blocks, and four methods for correcting the error are proposed. Detailed descriptions thereof have been provided in the above explanation concerning the pointing device 100 including the controller 130.

Through the above-described process, the pointing device 100 is able to correct the error that occurs in the x-coordinate of the pointing device 100. Accordingly, the pointing device 100 can prevent an error from occurring around the inter-block boundary and can improve the accuracy of calculating the current location.

Hereinafter, the infrared light emitting period will be explained with reference to FIG. 9. FIG. 9 illustrates a period of an optical signal output from the TV 200 according to an exemplary embodiment.

As shown in FIG. 9, the infrared light emitting period includes four periods, a Y light emitting period, a reference signal emitting period, an X2 emitting period, and an Xb emitting period.

The Y light emitting period is a period during which pixel lines of an x-axis direction of the display panel emit light one by one. The infrared light emitted during the Y light emitting period is an optical signal that is used in calculating a current y-coordinate of the pointing device 100.

The reference signal light emitting period is a period during which all of the pixels on the display panel emit light simultaneously a predetermined number of times. The light emitted during the reference signal light emitting period is an optical signal that is used for the pointing device 100 to sense a reference signal.

The X2 light emitting period is a period during which pixel lines of a y-axis direction included in each block group emit light one by one in sequence with respect to all of the block groups. The infrared light emitted during the X2 light emitting period is an optical signal that is used for calculating the location of a current x-coordinate of the pointing device 100 within a block group.

The Xb light emitting period is a period during which pixels included in each block emit light at a time on a block basis in sequence with respect all of the blocks. The infrared light emitted during the Xb light emitting period is an optical that is used for calculating a block to which the current x-coordinate belongs.

As shown in FIG. 9, the reference signal may be a signal of a pattern in which an optical signal is generated four times at regular time intervals. However, the reference signal may be a signal of other pattern.

As described above, the TV 200 emits the infrared light for the pointing device 100 in the infrared light emitting periods while displaying an image.

The pointing device 100 senses the infrared light emitted from the TV 200. Since all of the pixels emit the infrared light during the reference signal light emitting period, the pointing device 100 senses all of the four infrared light signals emitted during the reference signal light emitting period. Therefore, if there is a signal that is sensed four times at regular time intervals among the sensed optical signals, this signal is determined to be a reference signal. Therefore, the pointing device 100 is able to know a point of time when the reference signal is sensed. According to an exemplary embodiment with reference to FIG. 9, when four infrared signals are emitted during the reference signal light emitting period, these four infrared signals are reference signals, and points of time R1, R2, R3 and R4 are detected by the pointing device 100.

Also, the pointing device 100 calculates points of time A, B and C when the first optical signal, the third optical signal, and the second optical signal are sensed with reference to the points of time R1 through R4 of sensing the reference signals. More specifically, the pointing device 100 calculates at which point of time the first optical signal is sensed within the Y light emitting period, using a time difference Y between the point of time R1 of sensing a first reference signal and the point of time A of sensing the first optical signal. The pointing device 100 calculates at which point of time the second optical signal C is sensed within the Xb light emitting period, using a time difference Xb between the point of time R4 sensing a fourth reference signal and the point of time C of sensing the second optical signal. Also, the pointing device 100 calculates at which point of time the third optical signal B is sensed within the X2 light emitting period, using a time difference X2 between the point of time R4 of sensing the fourth reference signal and the point of time B of sensing the third optical signal.

The pointing device 100 calculates the y-coordinate of the current location using the point of time A of sensing the first optical signal. Also, the pointing device 100 calculates a location of a block to which the current x-coordinate of the pointing device 100 belongs using the point of time C of sensing the second optical signal. Also, the pointing device 100 calculates a location of the x-coordinate within the block group using the point of time of sensing B of sending the third optical signal. Accordingly, the pointing device 100 is able to calculate the x-coordinate of the current location using the block location information and the information about a location within the block group.

As described above, the TV 200 emits the infrared light in an appropriate form during the infrared light emitting periods of FIG. 9, and the pointing device 100 senses the emitted infrared light, so that the pointing device 100 can calculate its own location.

FIG. 10 is a view illustrating block groups and blocks of the display panel according to an exemplary embodiment. In FIG. 10, the display panel consists of 24 pixels of the x-axis and 11 pixels of the y-axis. Pixel lines of the y-axis direction (columns X11 through X46) are classified into eight blocks (Xb11 through Xb42) and four block groups (Xg1 through Xg4).

The block group recited herein refers to a basis on which the pixels lines of the y-axis direction emit infrared light. That is, during the X2 light emitting period, the TV 200 controls the pixel lines of the y-axis direction included in one block group to emit infrared light in sequence. For example, in FIG. 10, one block group includes 6 pixel lines and four block groups are included in total. Therefore, during the X2 light emitting period, the TV 200 controls columns X11, X21, X31, X41 to emit light at a time, controls columns X12, X22, X32, X42 to emit light at a time, and so on, and finally controls columns X16, X26, X36, X46 to emit light at a time. In other words, during the X2 light emitting period, the light is emitted in an order of:
(X11, X21, X31, X41)→(X12, X22, X32, X42)→(X13, X23, X33, X43)→(X14, X24, X34, X44)→(X15, X25, X35, X45) →(X16, X26, X36, X46).

Each group of three pixels lines of the y-axis direction from the first pixel line (columns X11 through X46) form one block. The block is a basis on which light is emitted at a time during the Xb light emitting period. Specifically, during the Xb light emitting period, the TV 200 controls all pixels included in block Xb11 to emit light at a time, controls all pixels included in block Xb12 to emit light at a time, and so on, and finally controls all pixels included in block Xb42 to emit light at a time. Accordingly, during the Xb light emitting period, the light is emitted in an order of: Xb11→Xb12→Xb21→Xb22→Xb31→Xb32→Xb41→Xb42.

As described above, by defining the block group as a basis on which distanced lines emit light during the X2 light emitting period, and defining the block as a basis on which neighboring lines emit light during the Xb light emitting period, the error occurring in the inter-block boundary can be prevented as described above.

Figure 11:
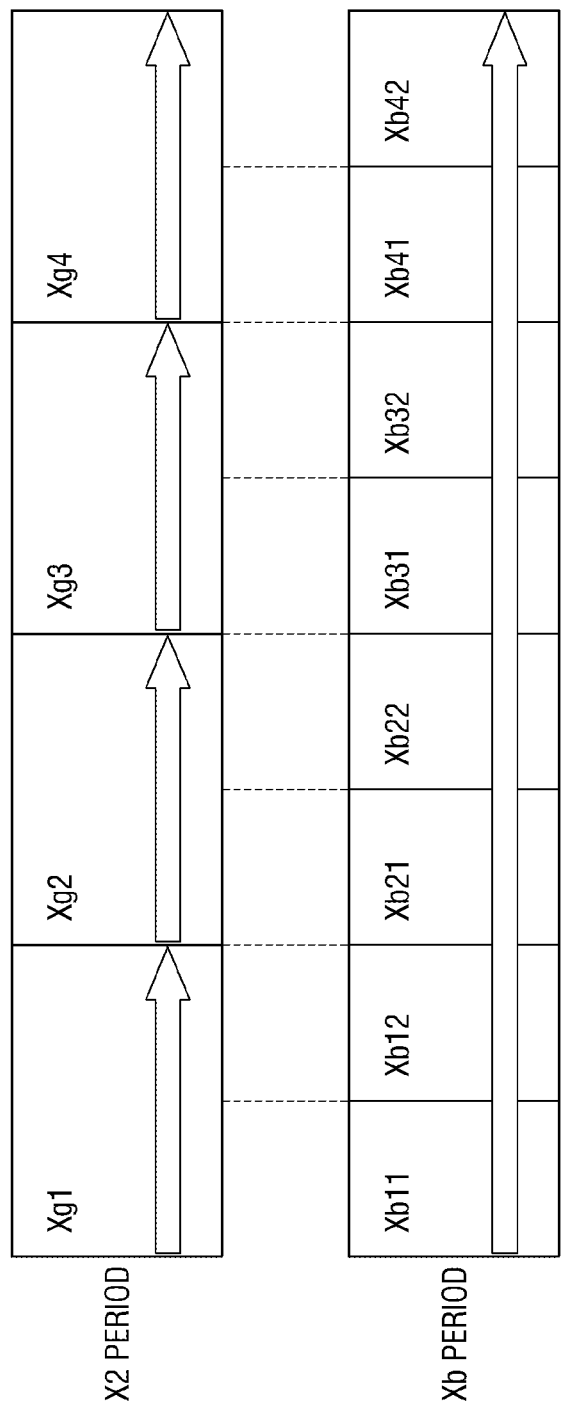
FIG. 11 is a view illustrating a process of driving a display panel according to an exemplary embodiment.

FIG. 11 is a view illustrating a process of driving the display panel according to an exemplary embodiment. As shown in FIG. 11, during the X2 light emitting period, the TV 200 controls four lines each belonging to each of block groups Xg1, Xg2, Xg3, Xg4 to emit light at the same time. During the Xb light emitting period, the TV 200 emits light on a block basis from blocks Xb11 to Xb42.

Figure 12A:
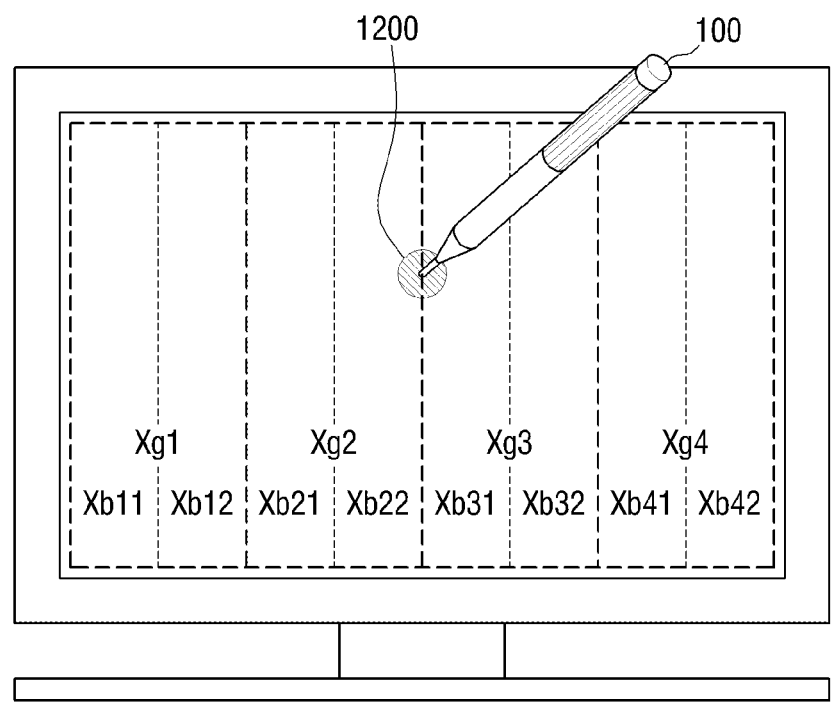
FIG. 12A is view illustrating a pointing device located at a boundary between blocks according to an exemplary embodiment.
Figure 12B:
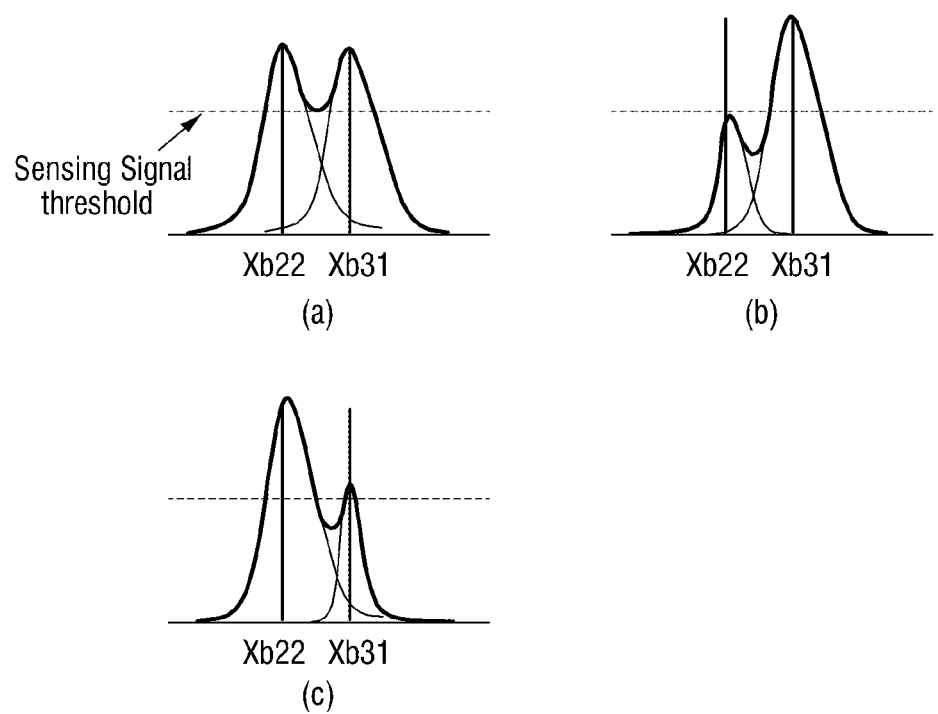
FIG. 12B is a view illustrating examples of signals sensed from the boundary between the blocks according to an exemplary embodiment.

FIG. 12A illustrates a pointing device which is located at a boundary between blocks according to an exemplary embodiment, and FIG. 12B illustrates examples of a signal sensed from an inter-block boundary according to an exemplary embodiment.

As shown in FIG. 12A, if the pointing device 100 is located in a boundary 1200 between blocks Xb22 and Xb31, the pointing device 100 senses infrared signals of forms shown in FIG. 12B.

Graph (a) of FIG. 12B illustrates the same size signal sensed from the blocks Xb22 and Xb31, graph (b) illustrates a signal of block Xb22 which is smaller than a signal of block Xb31, and graph (c) illustrates a signal of block Xb22 which is larger than a signal of block Xb31.

If the pointing device 100 is located in the boundary between the blocks as described above, signals are not clearly discriminated between the blocks, and thus, there may be an error indicating misalignment between the blocks and the pixel lines. However, such an error in the inter-block boundary can be prevented according to the above exemplary embodiment.

FIG. 13 is a view illustrating a location calculated before error correction is made and a location calculated after error correction is made according to an exemplary embodiment.

As shown in FIG. 13, if a related-art method for calculating a location is used (1310), an error deviated from a inter-block boundary 1300 as much as one block occurs. However, if the method of calculating the location according to the present disclosure is used (S1320), the line is continuously connected without an error.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A pointing device which operates in association with a display apparatus, the pointing device comprising:
   an optical sensor which senses a plurality of optical signals; and
   a controller which calculates a current location pointed by the pointing device on a screen of the display apparatus divided into a plurality of blocks, based on points of time at which the plurality of optical signals are sensed by the optical sensor on the screen of the display apparatus,
   wherein the controller calculates the current location using the plurality of blocks, and corrects a location error that occurs when the current location pointed by the pointing device is located adjacent to a boundary area between at least two adjacent blocks among the plurality of blocks.

2. The pointing device as claimed in claim 1, wherein the plurality of optical signals comprise first, second and third optical signals,
   wherein the controller:
   calculates a first axis coordinate of the current location based on a first point of time at which the first optical signal is sensed;
   calculates first location information indicating a location of a block, among the plurality of blocks, to which a second axis coordinate of the pointing device belongs, based on a second point of time at which the second optical signal is sensed;
   calculates second location information indicating a location within a block group comprising at least two adjacent blocks among the plurality of blocks, based on a third point of time at which the third optical signal is sensed; and
   calculates the second axis coordinate of the current location based on the first location information and the second location information.

3. The pointing device as claimed in claim 2, wherein the plurality of optical signals further comprises at least one reference signal, and
   wherein the controller further:
   calculates at least one reference point of time at which the at least one reference signal is sensed, respectively;
   calculates the first axis coordinate based on the first point of time and the at least one reference point of time; and
   calculates the second axis coordinate based on the first location information, the second location information and the at least one reference point of time.

4. The pointing device as claimed in claim 2, wherein, if the location within the block group corresponding to the second location information does not correspond to the location of the block corresponding to the first location information, the controller determines that the location error has occurred.

5. The pointing device as claimed in claim 4, wherein, if it is determined that the location error has occurred, the controller changes the first location information or the second location information, thereby correcting the error.

6. The pointing device as claimed in claim 5, wherein, if the block corresponding to the first location information is a first block of a specific block group and the location corresponding to the second location information is a location included in a final block of the block group, the controller determines that the location error has occurred and changes the first location information so that the block corresponding to the first location information is changed to a previous block.

7. The pointing device as claimed in claim 5, wherein, if the block corresponding to the first location information is a first block of a specific block group and the location corresponding to the second location information is a location included in a final block of the block group, the controller determines that the location error has occurred and changes the second location information so that the location corresponding to the second location information is changed to a location included in the block corresponding to the first location information.

8. The pointing device as claimed in claim 5, wherein, if the block corresponding to the first location information is a final block of a specific block group and the location corresponding to the second location information is a location included in a first block of the block group, the controller determines that the location error has occurred and changes the first location information so that the block corresponding to the first location information is changed to a next block.

9. The pointing device as claimed in claim 5, wherein, if the block corresponding to the first location information is a final block of a specific block group and the location corresponding to the second location information is a location included in a first block of the block group, the controller determines that the location error has occurred and changes the second location information so that the location corresponding to the second location information is changed to a location included in the block corresponding to the first location information.

10. The pointing device as claimed in claim 1, wherein the plurality of optical signals are infrared light.

11. The pointing device as claimed in claim 1, further comprising a communication unit which transmits information about the calculated current location to the display apparatus.

12. A display apparatus, comprising:
a display panel which is divided into a plurality of blocks and displays an input image;
a driving unit which applies a driving voltage to the display panel; and
a controller which controls the driving unit to drive the display panel over a first light emitting period, a second light emitting period, and a third light emitting period,
wherein, during the first light emitting period, the controller controls pixel lines of a first axis direction on the display panel to emit light on a line basis in sequence, during the second light emitting period, the controller controls pixel lines of a second axis direction included in each block group, comprising at least two blocks of the plurality of blocks, to emit light on a line basis in sequence with respect to all of the block groups, and during the third light emitting period, the controller controls pixels included in each block of the plurality of blocks to emit light at a time on a block basis in sequence with respect to all of the blocks.

13. The display apparatus as claimed in claim 12, wherein the controller further controls the driving unit to drive the display panel over a fourth light emitting period during which all pixels included in the plurality of blocks on the display panel emit light at the same time a predetermined number of times.

14. The display apparatus as claimed in claim 13, wherein the controller controls the display panel to be driven in an order of the first light emitting period, the fourth light emitting period, the second light emitting period, and the third light emitting period.

15. The display apparatus as claimed in claim 12, wherein the first axis direction is an x-axis direction with respect to the display panel, and the second axis direction is a y-axis direction with respect to the display panel.

16. The display apparatus as claimed in claim 12, wherein the light emitted during the first light emitting period, the second light emitting period, and the third light emitting period are infrared light.

17. The display apparatus as claimed in claim 12, wherein the display apparatus is a plasma display panel (PDP) display apparatus.

18. An electronic board system comprising:
a display device which comprises a screen divided into a plurality of blocks and a controller, and displays an input image on the screen, wherein the controller:
during a first light emitting period, controls pixel lines of a first axis direction on the screen to emit first light on a line basis in sequence;
during a second light emitting period, controls pixel lines of a second axis direction included in each block group, comprising at least two blocks of the plurality of blocks, to emit second light on a line basis in sequence with respect to all of the block groups; and
during a third light emitting period, controls pixels included in each block of the plurality of blocks to emit third light at a time on a block basis in sequence with respect to all of the blocks; and
a pointing device which senses first, second and third optical signals from the first, second and third lights, respectively, calculates a current location pointed by the pointing device on the screen, based on points of time at which the first, second and third optical signals are sensed, and transmits information on the current location to the display device,
wherein the controller adjusts the current location if the current location is determined to be located adjacent to an boundary area between at least two adjacent blocks among the plurality of blocks.

19. The electronic board system of claim 18, wherein the pointing device:
calculates a first axis coordinate of the current location based on a first point of time at which the first optical signal is sensed;
calculates first location information indicating a location of a block, among the plurality of blocks, to which a second axis coordinate of the pointing device belongs, based on a second point of time at which the second optical signal is sensed;
calculates second location information indicating a location within a block group comprising at least two adjacent blocks among the plurality of blocks, based on a third point of time at which the third optical signal is sensed; and
calculates the second axis coordinate of the current location based on the first location information and the second location information.

20. The electronic board system of claim 19, wherein the controller, during a fourth light emitting period, controls all pixels included in the plurality of blocks on the screen to emit reference light at the same time a predetermined number of times,
wherein the pointing device senses at least one reference signal from the reference light, calculates at least one reference point of time at which the at least one reference signal is sensed, respectively, and calculates:
the first axis coordinate based on the first point of time and the at least one reference point of time; and
the second axis coordinate based on the first location information, the second location information and the at least one reference point of time.

21. The electronic board system of claim 20, wherein, if the location within the block group corresponding to the second location information does not correspond to the location of the block corresponding to the first location information, the controller determines that a location error has occurred, and
wherein, if it is determined that the location error has occurred, the controller changes the first location information or the second location information, thereby correcting the error.

* * * * *